Dec. 17, 1968 W. KOBNICK 3,416,843
BRAKE PRESSURE REGULATOR
Filed Dec. 14, 1966
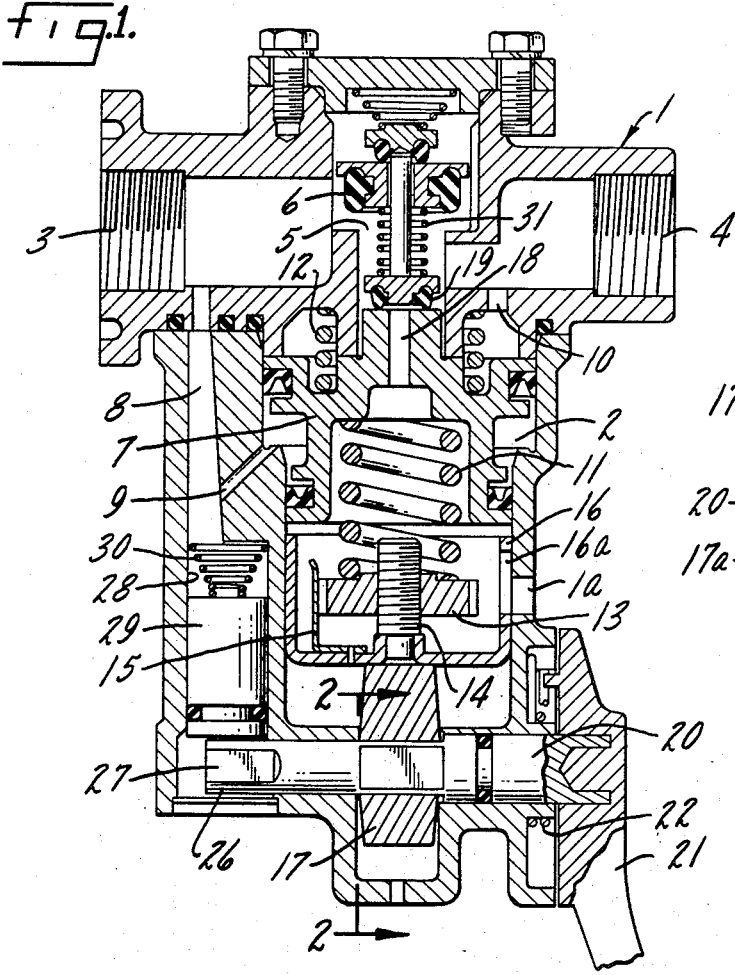
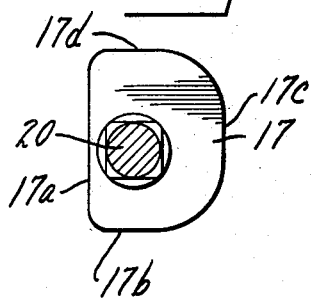
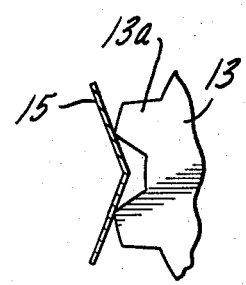
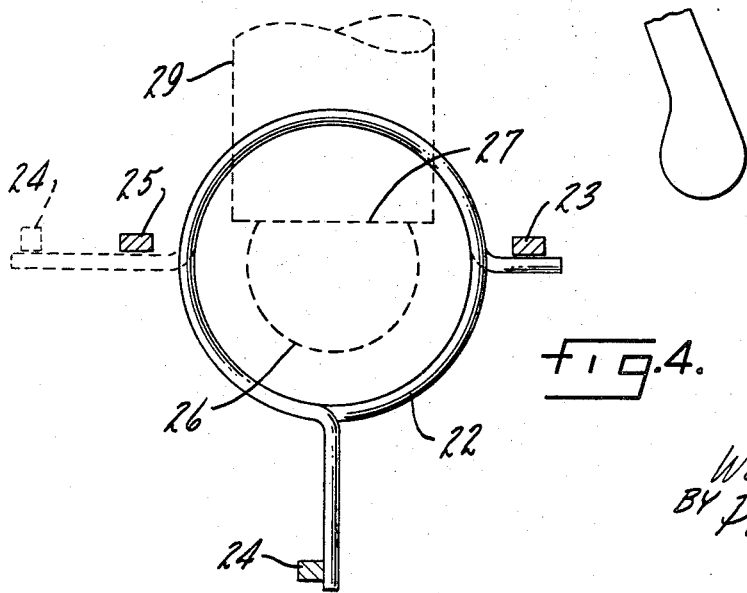
INVENTOR.
Werner Kobnick,
BY Parker & Carter
Attorneys.

United States Patent Office 3,416,843
Patented Dec. 17, 1968

3,416,843
BRAKE PRESSURE REGULATOR
Werner Kobnick, Heidelberg, Germany, assignor to Berg
 Mfg. & Sales Co., Des Plaines, Ill., a corporation of
 Illinois
Filed Dec. 14, 1966, Ser. No. 601,631
4 Claims. (Cl. 303—54)

ABSTRACT OF THE DISCLOSURE

A tractor-trailer air brake pressure regulator wherein a control piston is balanced on one side by system pressure and a control spring and on the other side by brake cylinder pressure and an exhaust spring. A variable radius cam is rotatable to vary the effect of the control spring in relation to the trailer load. The control spring can be prestressed, to adjust the regulator for use on trailers having different load and brake pressure characteristics, by manual turning of a movable control spring retainer. The exhaust spring is of sufficient predetermined force to move the control piston to exhaust position even though system pressure is present against the piston. The cam is spring-urged out of its brake-released position. A detent piston, responsive to system pressure, detains the cam in brake-released position but is overcome by said spring-urging upon connection of a tractor and resultant drop in system pressure acting on said detent piston.

---

This invention relates to tractor-trailer vehicle air brake systems and has particular relation to means for regulating said systems in relation to the load carried by the trailer.

One purpose of the invention is to provide a brake pressure regulator having a balanced control piston.

Another purpose is to provide a brake pressure regulator for insuring substantial uniformity of braking action upon a tractor and trailer though the trailer may be empty.

Another purpose is to provide an air brake pressure regulator effective to reduce forces on a tractor draw bar when a tractor and trailer are of uneven weights.

Another purpose is to provide an air brake pressure regulator having means for exhausting the brake cylinders of a trailer and of accomplishing said exhaust against the action of brake pressure supplied by the trailer system.

Another purpose is to provide minutely adjustable means for prestressing of a control spring in an air brake pressure regulator.

Another purpose is to provide an air brake pressure regulator capable of use, with minor adjustment, upon many types of vehicles employing a variety of brake pressures at various vehicle loads.

Another purpose is to provide an air brake pressure regulator adjustable when installed on the vehicle.

Another purpose is to provide an air brake pressure regulator having means for precluding inadvertent movement of the trailer in the absence of braking capability.

Another purpose is to provide an air brake pressure regulator for trailers having means automatically effective to move the regulator into a braking capability upon connection of a tractor to the trailer.

Another purpose is to provide an air brake pressure regulator having means automatically effective to move the regulator into braking capability upon reduction in the system pressure supplied to the regulator.

Other purposes may appear from time to time during the course of the specification and claims.

The invention is illustrated more or less diagrammatically in the accompanying drawings, wherein:

FIGURE 1 is a side elevation in partial cross section;

FIGURE 2 is a view taken on the line 2—2 of FIGURE 1;

FIGURE 3 is a partial detail view illustrating one element of the invention; and FIGURE 4 is another detail view illustrating another feature of the invention.

Like parts are indicated by like numerals throughout the specification and drawings.

Referring now to the drawings, and particularly to FIGURE 1 thereof, the numeral 1 generally designates a housing. The housing 1 defines therein an internal chamber indicated generally by the numeral 2. A brake pressure inlet is indicated at 3. A brake pressure outlet, for connection to the brake cylinders of a trailer for example, is indicated at 4. A valve seat 5 is positioned between inlet 3 and outlet 4 for communication therebetween when the valve element 6 is off the seat 5, as illustrated in the drawings.

Reciprocal within chamber 2 is a control or weigh piston 7. Passage 8 and branch passage 9 communicate the inlet 3 with the chamber 2 on one side of control piston 7. Passage 10 communicates outlet 4, and thus the brake cyliners of the vehicle, with the opposite side of control piston 7. Active against piston 7, and urging the same in the direction in which it is urged by the brake pressure passing through inlet and passages 8 and 9, is a control or weigh spring 11. Active against control piston, to urge the same in its opposite direction, is an exhaust spring 12.

A seat or retainer 13 is provided for the spring 11. The retainer 13 is threaded upon upstanding bolt member 14. The circumference of retainer 13 carries spaced teeth 13a between an adjacent pair of which a yielding detent 15 is engageable. The bolt 14 and detent 15 are carried by a cup-shaped member 16, the lower surface of which is engaged by a cam 17.

An exhaust passage 18 extends through control piston 7 for communication, through aperture 16a in member 16 and through aperture 1a in the wall of housing 1, to atmosphere. Exhaust passage 18 is closable by exhaust valve 19.

The cam 17 is fixed upon a cam shaft 20. As may be best seen in FIGURE 2, the cam 17 has a plurality of radii, the same being indicated, in ascending order of length, at 17a, 17b, 17c and 17d. The shaft 20 extends externally of housing 1 for connection to an operating lever 21. A dual-like coil spring 22 has one of its legs in engagement with a fixed abutment 23 on housing 1 and its opposite leg in engagement with an abutment 24 on lever 21. Indicated at 25 is a second abutment fixed on housing 1 for contact by said other leg of spring 22.

The shaft 20 has a distal portion 26 on which a flat 27 is formed. Slidable in a subchamber 28 of housing 1 is a detent piston 29 urged toward engagement with the distal portion 26 of shaft 20 by yielding means 30 and by brake pressure present in passage 8 which communicates with chamber 28.

The use and operation of the invention are as follows:

With trailer brake system pressure present at inlet 3, the same is delivered through passages 8, 9 to the chamber 2 beneath, as the parts are shown in the drawings, the control piston 7 to urge the same in a first direction, i.e. upwardly as the parts are shown. Control portion 7 is also urged upwardly by the control spring 11. Upward movement of control piston 7 is effective, through the mediacy of exhaust valve 19 and spring 31, which engages valves 19 and 6, to move valve 6 off its seat 5 and thus to provide for delivery of said fluid pressure from inlet 3 through the seat 5 and through outlet 4 to the brake cylinders of the trailer to apply the brakes of the trailer. Brake cylinder pressure present in outlet 4 is delivered through passage 10 to the opposite side of control piston 7 against which spring 12 engages. Thus control piston 7 is finely balanced to provide for appropriate opening, as will appear hereinbelow, in respect to the "load" or total weight of the trailer and its cargo.

The force or effect of control spring 11 may be adjusted, to a fine degree, to provide for application of proper brake pressure to trailers having various "empty" brake pressure requirements. For this purpose the spring retainer member 13 is rotatable on bolt 14. The yielding detent 15 is effective to secure the member 13 against inadvertent movement on bolt 14. The teeth 13a of member 13 serve the dual function of engagement with the detent 15 and minute adjustment of the member 13 on bolt 14. It will be observed that aperture 16a in member 16 and exhaust aperture 1a of housing 1 are positioned in alignment with each other and with the member 13. Thus the insertion of a simple tool, e.g. a screwdriver, may be employed to engage the teeth 13a and to rotate the member 13 on bolt 14, thus prestressing or pretensioning the control spring 11 as desired and in correlation with the brake pressure requirements of the trailer to which the regulator is applied. Such adjustment may be accomplished with the regulator installed on the trailer. Thus, also the regulator may be employed on a variety of types of trailers having varying brake pressure requirements without substantial or structural change in the structure of the regulator.

The cam 17 is effective to adjust the force or affect of control spring 11 in consonance with the "load" of the trailer. As illustrated, the cam 17 is shown as having, essentially, four main radii. The radius 17a, being the shortest, may be employed to position the regulator in the "brakes released" position since, in that position, the control spring 11 is permitted its maximum extension rendering the control spring 11 substantially ineffective against control piston 7. The radius 17b is employed to provide such tension of control spring 11 as will insure delivery of a predetermined brake pressure as required by an empty or "no load" trailer. Radius 17c is employable when the trailer is "half loaded" and radius 17d, being the greatest and providing for maximum compression or stressing of control spring 11, when the trailer is at "full load."

The cam 17 is shown as rotatable with shaft 20 which is in turn rotatable in response to rotation of lever 21. While the lever 21 is shown as a manually rotatable handle, it will be understood that the same may be automatically rotated, in response to the load of the trailer, by various means. An example of an automatic rotation means may be found, for example, in United States Letters Patent 3,285,673, issued Nov. 15, 1966.

Similarly, while cam 17 is shown as having four primary radii, it will be understood that the cam 17 could be provided with a greater number of radii to provide for a brake pressure regulation of more minute increments.

Should the cam 17 be in its "brakes-released" position, as would be the case, for example, if the trailer were to be moved about or marshalled, it is important that the same be rectified before the trailer and tractor are moved onto the highway or into a situation in which trailer braking may be required. With the cam 17 in its released position, the flat 27 of shaft portion 26 is engaged by piston 29. In such released position of cam 17, also, the coil spring 22 has been tensioned as indicated in FIGURE 4. With brake pressure at inlet 3 and passage 8, the piston 29 is held against the flat 27 to yieldingly detain the shaft 26 in such released position against the action of spring 22. As soon as the tractor is connected to the trailer, however, the brake pressure at inlet 3 diminishes and may drop to a value approaching zero. At this point the force of spring 22 is sufficient to rotate the shaft 20 and lever 21 against the action of piston 29 and spring 30 to so position the cam 17 as to render the regulator in a brake-applying capacity. For example, the cam 17 may be rotated to position radius 17b beneath member 16 and thus to set the regulator at the "no load" or "empty-trailer" braking capability. The abutment 25 engages the movable leg of spring 22, as shown in dotted lines in FIGURE 4, to prevent the cam 17 from moving into a position such as would render the regulator into the position required for trailers having a greater load.

It will be observed that exhaust spring 12 is placed in compression upon the movement of control piston 7 toward a brake-applying position. With control spring 11 rendered relatively inactive by positioning cam 17 in "released" position and the brake cylinder pressure present above the control piston 7 through passage 10 and the compression spring 12 active above piston 7, it will be observed that sufficient force is available to move the control piston downwardly, even though trailer brake pressure be present beneath piston 7. Upon such downward movement of control piston 7 the same is separated from exhaust valve 19 and the passage 18 is exposed to outlet 4 and thus to reception of brake cylinder pressure. Downward movement of control piston 7 is effective also to close valve 6 upon its seat 5 and thus to preclude further delivery of fluid pressure from inlet through outlet 4 to the brake cylinders. Brake cylinder pressure passing through passage 18 is exhausted to atmosphere through apertures 16a and 1a.

There is claimed:

1. A regulator for fluid pressure brake systems, including a housing, a fluid pressure inlet and a fluid pressure outlet in said housing, a valve seat between said inlet and outlet, a valve engaging said seat to close communication between said inlet and outlet and movable off said seat to open communication therebetween and means in said housing for moving said valve off said seat including a reciprocal control piston, a control spring engaging one side of said piston to urge said control piston in one direction to move said valve off said seat, passage means communicating said inlet with said one side of said control piston, adjustment means engaging said control spring in said housing and movable to vary the prestress of said control spring, means for varying the pretension of said control spring in relation to the fluid pressures desired at said outlet, said last-named means including a variable-radius cam rotatable in said housing and operative against said control spring, and means responsive to fluid pressure at said inlet to retain said cam in said one of its rotational positions against the action of said yielding means.

2. A tractor-trailer air brake pressure regulator including a housing, a pressure inlet in said housing, a pressure outlet in said housing, a valve controlling communication between said inlet and outlet, a control piston reciprocal in said housing for operating contact with said valve, said control piston being balanced on one side by system pressure entering said inlet and a control spring, said control piston being balanced on the other side by brake cylinder pressure at said outlet and an exhaust spring, a retainer engaging said control spring and a cam engaging said retainer to vary the prestress of said control spring, said cam having a plurality of individual flat external surfaces thereon and engageable with said retainer, the radius of each of said flat surfaces differing from the radius of the remainder of said flat surfaces.

3. The structure of claim 2 wherein said cam has a brake-released position rendering said control spring ineffective and characterized by and including yielding means urging said cam out of said brake-released position.

4. The structure of claim 3 characterized by and including a detent piston responsive to system pressure and engaging said cam to retain the same in its brake-released position.

References Cited

UNITED STATES PATENTS

| | | | |
|---|---|---|---|
| 2,322,518 | 6/1943 | Huber | 303—52 |
| 2,935,291 | 5/1960 | Stelzer | 251—263 |
| 3,284,142 | 11/1966 | Bueler | 303—54 X |

MILTON BUCHLER, *Primary Examiner.*

J. J. McLAUGHLIN, *Assistant Examiner.*

U.S. Cl. X.R.

74—107; 137—627.5; 251—263; 267—1; 303—56